United States Patent
Jutkowitz et al.

(10) Patent No.: US 12,233,711 B2
(45) Date of Patent: Feb. 25, 2025

(54) POWER HOP MITIGATION SYSTEM

(71) Applicant: Zimeno Inc., Livermore, CA (US)

(72) Inventors: Avery J. Jutkowitz, Pleasanton, CA (US); Karan Kaushik, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/520,487

(22) Filed: Nov. 27, 2023

(65) Prior Publication Data

US 2024/0174080 A1 May 30, 2024

Related U.S. Application Data

(60) Provisional application No. 63/429,141, filed on Nov. 30, 2022.

(51) Int. Cl.
| | |
|---|---|
| *B60W 30/02* | (2012.01) |
| *B60K 17/34* | (2006.01) |
| *B60K 23/08* | (2006.01) |
| *B60W 10/04* | (2006.01) |
| *B60W 10/119* | (2012.01) |
| *G07C 5/02* | (2006.01) |
| *B60W 50/08* | (2020.01) |

(52) U.S. Cl.
CPC .......... *B60K 23/0808* (2013.01); *B60K 17/34* (2013.01); *B60W 10/04* (2013.01); *B60W 10/119* (2013.01); *B60W 30/02* (2013.01); *G07C 5/02* (2013.01); *B60K 2023/0816* (2013.01); *B60W 50/08* (2013.01); *B60W 2300/152* (2013.01); *B60W 2540/045* (2020.02)

(58) Field of Classification Search
CPC ............... B60K 23/0808; B60K 17/34; B60K 2023/0816
USPC ........................................................... 701/69
See application file for complete search history.

(56) References Cited

U.S. PATENT DOCUMENTS

| | | | | |
|---|---|---|---|---|
| 5,474,147 | A * | 12/1995 | Yesel | B60K 17/356 180/197 |
| 6,401,853 | B1 * | 6/2002 | Turski | F02P 5/1504 180/197 |
| 7,264,078 | B2 * | 9/2007 | Rodeghiero | B60K 23/0808 180/245 |
| 2006/0009897 | A1 | 1/2006 | Schick et al. | |
| 2006/0191692 | A1 | 8/2006 | Holt et al. | |
| 2008/0221756 | A1 | 9/2008 | Miskin | |
| 2008/0319623 | A1 * | 12/2008 | Dobkin | B60W 30/20 701/1 |
| 2009/0107747 | A1 * | 4/2009 | Luehrsen | B60T 8/175 180/197 |
| 2011/0172889 | A1 | 7/2011 | Zhang et al. | |
| 2012/0303236 | A1 | 11/2012 | Andonian et al. | |
| 2014/0081555 | A1 * | 3/2014 | Seelke | A01B 63/112 701/102 |

(Continued)

OTHER PUBLICATIONS

International Search Report for PCT/US 23/81217 dated May 1, 2024.

(Continued)

*Primary Examiner* — Roger L Pang
(74) *Attorney, Agent, or Firm* — Rathe Lindenbaum LLP

(57) ABSTRACT

In response to power hopping, a controller modulates the power and/or speed supplied by at least one of a rear drive axle and a front drive axle of the tractor so as to mitigate the power hopping.

21 Claims, 3 Drawing Sheets

(56) References Cited

U.S. PATENT DOCUMENTS

| | | | |
|---|---|---|---|
| 2016/0001654 A1* | 1/2016 | Nolte | B60K 23/04 |
| | | | 701/69 |
| 2017/0325394 A1* | 11/2017 | Clement | A01B 71/02 |
| 2019/0225226 A1 | 7/2019 | Kang et al. | |

OTHER PUBLICATIONS

Wiley, Jack C. and Turner, Reed J., "Power Hop Instability of Tractors", Agricultural Equipment Technology Conference, Feb. 10-13, 2008, Louisville, KY, ASABE Publication No. 913C0108.

* cited by examiner

POWER HOP MITIGATION SYSTEM

CROSS-REFERENCE TO RELATED PATENT APPLICATIONS

The present non-provisional application claims benefit from co-pending U.S. provisional patent Application Ser. No. 63/429,141 filed on Nov. 30, 2022, by Jutkowitz et al. and entitled POWER HOP MITIGATION SYSTEM, the full disclosure of which is hereby incorporated by reference.

BACKGROUND

Offroad vehicles in soft ground tend to lift the front wheels off the ground when 4-wheel drive is on. This is caused by the front tires moving at a higher ground speed than the rear wheels and pushing the front of the vehicle off the ground. After the wheels leave the ground, the vehicle pitches upward until gravity brings the front end back down and reengages the front wheels with the ground. This leads to a repeating cycle of the front lifting and hitting the ground. This phenomenon is called "power hopping".

Power hopping causes two major negative effects. First, when the front wheels are off the ground the ability to steer the vehicle is lost. Second, when the front wheels are off the ground, they are unable to help pull the vehicle forward and tractive effort is lost.

Figure 1:
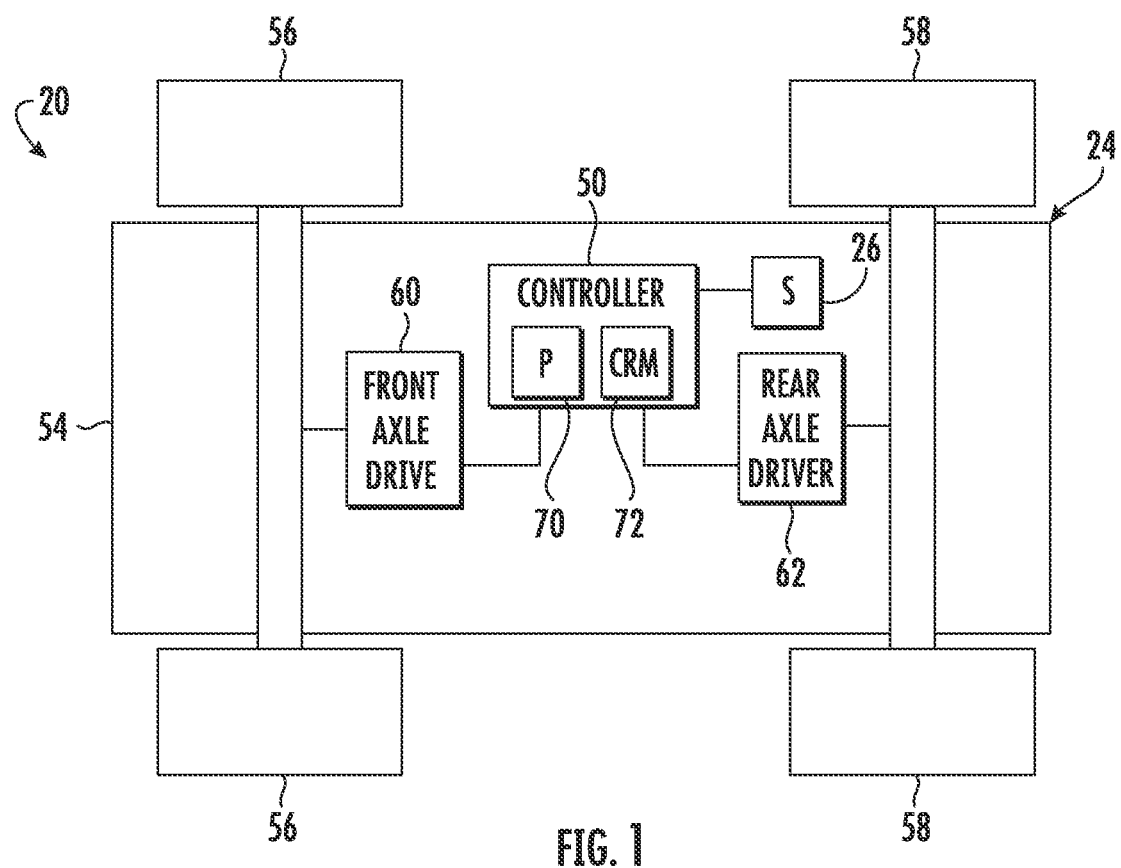
FIG. 1 is a diagram schematically illustrating portions of an example power hop mitigation system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example power hop mitigation systems, non-transitory computer-readable mediums, and methods that mitigate or reduce the amplitude or frequency of power hopping by a tractor. As a result, the example power hop mitigation systems maintain a front axle of a tractor (or other vehicle) on the ground to assist in steering control. The example power hop mitigation systems, mediums and methods may be implemented with little or no physical modification of the tractor.

The example power hop mitigation systems comprise a controller that, in response to power hopping by a tractor (or other vehicle), is configured to output control signals to modulate power and/or speed to at least one of a front axle drive and a rear axle drive of the tractor to mitigate power hopping. The example controller may receive signals from a sensor and determines the oscillatory pattern or nature of the power hopping. Based upon this determination, the controller may modulate the power and/or speed supplied or transmitted to at least one of the front axle drive and the rear axle drive so as to offset or counter the determined oscillatory or wave-like pattern of the power hopping.

The determination of the oscillatory pattern or wave-like nature of the power hopping and the output of the mitigation control signals may be triggered by the identification of an ongoing power hopping. In some implementations, the identification of an ongoing power hopping circumstance is itself determined by the controller based upon signals received from the sensor. In some implementations, an operator of the tractor may provide an input indicating the identification of an ongoing power hopping circumstance. In some implementations, the identification of an ongoing power hopping circumstance may be determined by the controller, wherein the controller outputs signals causing a visual or auditory notice of the ongoing power hopping circumstance to the operator, wherein the operator may then be provided with an opportunity to provide an input to trigger or initiate the evaluation or determination of the oscillatory nature of the ongoing power hopping and the output of the power hop mitigation control signals.

In some implementations, the modulation of power and/or speed to mitigate power hopping may be such that the front axle drive receives less power or is slowed at particular times so as to mitigate or reduce power hopping. The speed and/or power of the front axle drive may be periodically or intermittently reduced, wherein the timing of such power and/or speed reduction is based upon the determined oscillation of the power hopping. For example, an identified power hopping may be determined to have a sinusoidal pattern having a particular amplitude, frequency and phase. The amplitude may be steady or may be increasing. Based upon this pattern or oscillation, the controller may reduce the power and/or speed of the front axle drive in a corresponding but offset patterned fashion. The reduction in the speed and/or power of the front axle drive may be timed by the controller so as to occur just prior to the rise of the sinusoidal wave or peak (just prior to the front tires being lifted from the underlying terrain or ground).

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

FIG. 1 schematically illustrates portions of an example power hop mitigation system 20. System 20 controls or regulates the power and/or speed of at least one of the front axle to drive and the rear axle drive of a tractor, or other vehicle, in a timed manner so as to mitigate or reduce power hopping by the tractor. As result, the front tractor tires or wheels may be maintained in contact with the underlying terrain or ground for greater durations of time, improving the ability to steer and control the tractor. As shown by FIG. 1, system 20 comprises tractor 24, sensor 26 and controller 50.

Tractor 24 comprises a mainframe or body 54 supporting a pair of front wheels 56 and a pair rear wheels 58. Tractor 24 further comprises front axle drive 60 and rear axle drive 62. Front axle drive provides power and/or speed to front wheels 56. Rear axle drive provides power and/or speed to rear wheels 58. Front axle drive 60 and rear axle drive 62 may have a right of different configurations. For example, in some implementations, front axle drive 60 and rear axle drive 62 may comprise an electric motor, driven by a battery, which drives a hydraulic pump which drive a hydraulic motor that generates torque, wherein the torque is transmitted by at least partially distinct transmissions to front wheels 56 and rear wheels 58, respectively.

In some implementations, the front axle drive 60 and the rear axle drive 62 may each comprise dedicated electric motors and associated transmissions that directly drive front wheels 56 and rear wheels 58. In some implementations, front axle drive 60 and rear axle drive 62 may share an electric motor, were in clutches or the like are used to deliver torque from the electric motor to the front wheels 56 and the rear wheels 58. In some implementations, front axle drive 60 and rear axle drive 62 are powered by an internal combustion engine, wherein the generated torque is transmitted by different transmissions to the front axle drive 60 and the rear axle drive 62. At least one of the two axle drives has a speed or power that may be modulated relative to the other of the two axle drives.

Sensor 26 comprises a sensor that is configured to output signals that may be used by controller 52 determine an oscillation pattern for a power hopping circumstance. Sensor 26 may be in the form of wheel speed sensors, front axle drive torque sensors, inertial measurement sensors, axle load sensors and the like. For example, in some implementations, oscillatory lifting and lowering of a front and of the tractor may be determined based upon signals from an inertial measurement unit or sensor carried by the tractor. Such oscillatory lifting and lowering motion may be compared to a predetermined frequency and/or amplitude threshold by controller 50 to identify an ongoing power hopping of the tractor.

Figures 2, 3:
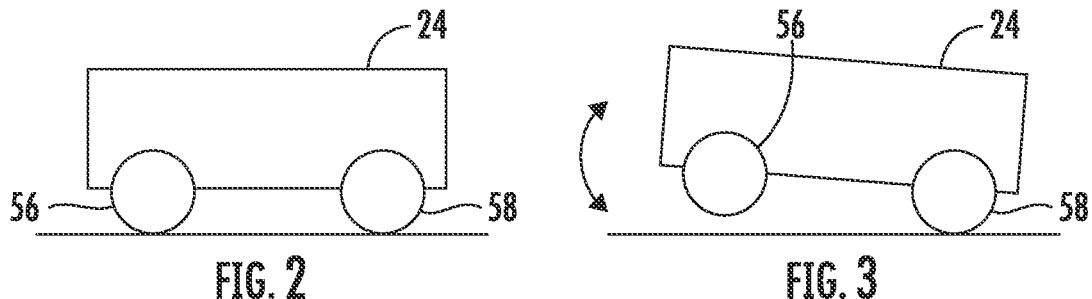
FIG. 2 and FIG. 3 are diagrams illustrating an example oscillatory power hopping of the example power hot mitigation system of FIG. 1.

Controller 50, in response to a power hopping by the tractor 24, is configured to output control signals that cause the power and/or speed being supplied or delivered by at least one of the front axle drive 60 and the rear axle drive 62 to be modulated in a timed fashion so as to mitigate power hopping. FIGS. 2 and 3 schematically illustrate power hopping of tractor 24. When a four-wheel-drive is on, when power is being delivered to both front wheel 56 and rear wheels 58, the front wheels 56 may, at times, move at a higher ground speed than the rear wheels 58. This may result in the front wheels being pushed off the ground until gravity returns the front wheels 56 to ground. This often leads to a repeating cycle of the front wheel 56 lifting and hitting the ground, what is sometimes referred to as "power hopping".

Figure 4:
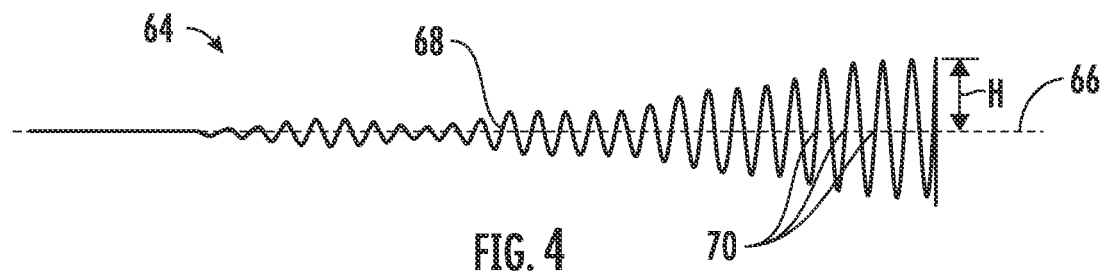
FIG. 4 is a diagram illustrating an example oscillatory pattern of the power hopping shown in FIGS. 2 and 3.

FIG. 4 illustrates one example plot of the vertical height of the front wheels 56 during such power hopping. The broken line 66 represents the underlying terrain or ground. In the example illustrated, the ground may be sufficiently soft such that the tires are wheels, at times, extend below the surface of the ground. Into the surface of the ground. As shown by FIG. 4, the power hopping cycle 64 may have a sinusoidal oscillation pattern. As further shown by FIG. 4, in some implementations, the amplitude or the height H during those times 68 at which the wheels rise above the ground 66 may increase over time.

Controller 50 may comprise a processor 70 and a computer readable medium 72. Processor 70 comprises a processing unit configured to carry out various computing operations based upon instructions contained on computer readable medium 72. Computer readable medium 72 comprises a non-transitory computer-readable medium in the form of software. In some implementations, processor 70 and computer readable medium 72 may be embodied as an application-specific integrated circuit. The instructions contained in computer readable medium 72 cause processor to carry out a process for mitigating power hopping.

The instructions contained in computer readable medium 72 direct processor 70 to receive signal from a sensor 26 and to determine the current power hopping oscillating pattern, such as the example oscillating pattern 64 shown in FIG. 4. Once determined, the instruction contained in computer readable medium 72 direct processor 70 to output control signals to at least one of the front axle drive 60 or the rear axle drive 62 so as to time modulation or changes in the power and/or speed of drive 60, 62 to mitigate power hopping. In one implementation, controller 50 may output control signals causing the power and/or speed being supplied by front axle drive 60 to front wheel 56 to be reduced relative to the power and/or speed being supplied by rear axle drive 62 to rear wheels 58. This power/speed reduction may be timed based upon the determined current power hopping oscillation pattern. The power/speed reduction may occur with a second sinusoidal pattern offset from the power hopping sinusoidal pattern. For example, the power/speed reduction may be timed or cycled to occur at points 70 prior to the onset of the elevation of the wheels 56 above ground 66.

In some implementations, the modulation of the supplied power and/or speed supplied to the front axle 60 may result in the oscillating pattern changing, wherein controller 50 may periodically or continuously determine an updated oscillation pattern 64 and wherein the degree to which the power and/or speed to front axle 60 is modulated as well as the timing of such modulations may also change in accordance with the updated oscillation pattern 64. For example, the controller may be configured to determine a first sinusoidal oscillation pattern for a power hopping circumstance. In response, the controller may output control signals configured to modulate the power and/or speed being supplied by the front axle drive in a second sinusoidal oscillation pattern temporally offset from the first sinusoidal oscillation pattern. The controller 50 may be further configured to determine an updated sinusoidal oscillation pattern for the power hopping circumstance following the modulation of the power and/or speed being supplied by the front axle drive in the second sinusoidal oscillation pattern. In response, the controller 50 may be configured to output second control signals configured to modulate the power and/or speed being supplied by the front axle drive in a fourth sinusoidal oscillation different from the second sinusoidal oscillation pattern and temporally offset from the updated third sinusoidal oscillation pattern. In such an implementation, such a closed-loop feedback may facilitate enhanced power hop mitigation.

Figure 5:
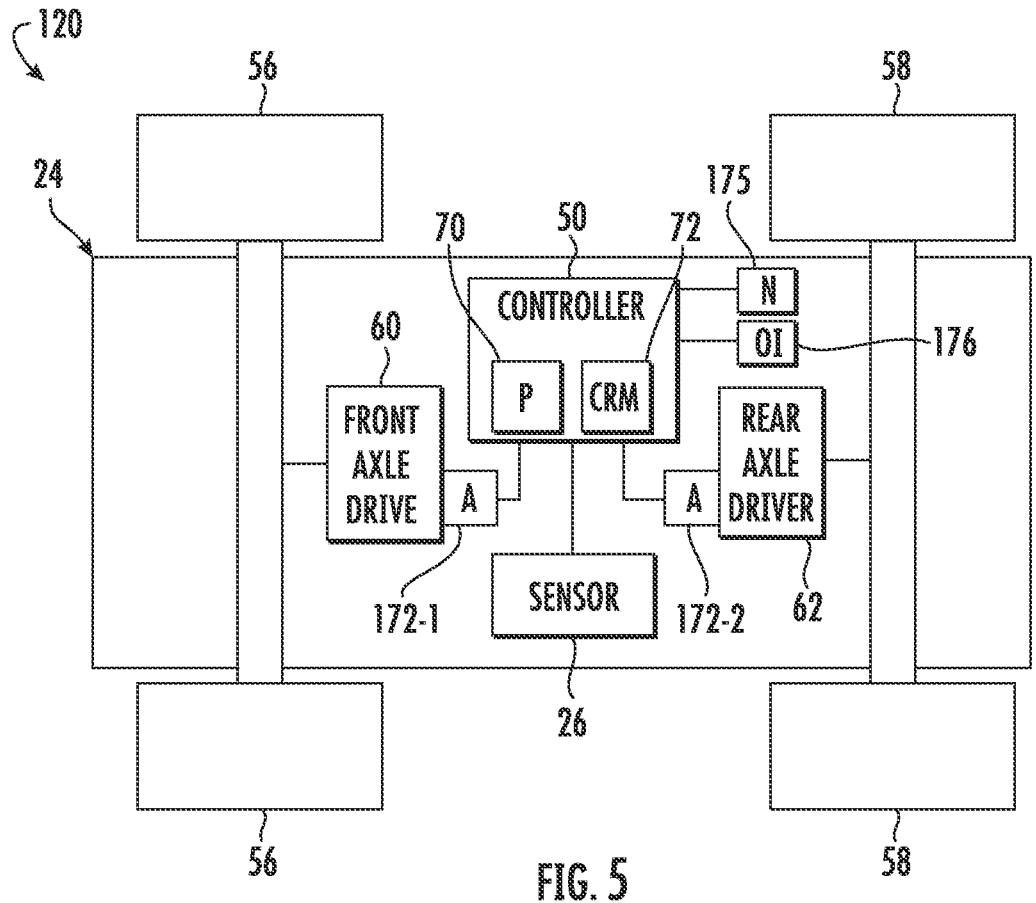
FIG. 5 is a diagram schematically illustrating portions of an example power hop mitigation system.

FIG. 5 schematically illustrates portions of an example power hot mitigation system 120. FIG. 5 illustrates an example of how a power hop mitigation system may include components to modulate the power/speed of the front axle drive and/or the rear axle drive. FIG. 5 further illustrates an example of how the power hop mitigation process may be triggered or initiated. System 120 is similar to system 20 described above except that actuators 172-1, 172-2 (collectively referred to as actuators 172) of the axle drives 60 and 62 are illustrated and that notifier 174 and operator input 176 are additionally included. Those remaining components of system 120 which correspond to components of system 20 are numbered similarly.

Actuator 172-1 comprises a component of front axle drive 60 by which the power and/or speed being supplied by front axle drive 60 to front wheels 56 may be adjusted, changed or modulated. Similarly, actuator 170-2 comprises a component of rear axle drive 62 by which the power and/or speed being supplied by rear axle drive 62 to rear wheels 58 may be adjusted, changed or modulated. Examples of such actuators, clutches, adjustable motors and various hydraulic components such as the use of valves, hydraulic motors with adjustable swash plates and the like.

Notifier 174 comprises a device for notifying the operator of tractor 24 when tractor 24 is experiencing a power hopping phenomena. Controller 50 may determine that such a power hopping phenomenon is occurring based upon signals from sensor 26, wherein controller 50 outputs control signals to notifier 170 for notifying the operator (either local or remote) that the power hopping is occurring. Although notifier is illustrated as being part of tractor 24, in other implementations, notifier 174 may be remote such as when the operator is also remote from tractor 24. Notifier 174 may be in the form of a visual notification, such as on a monitor or screen or with an LED light or the like. Notifier 174 may be in the form of an audible notification, such as a sound or warning. In some implementations, notifier 174 may be omitted.

Operator input 176 comprises an input device by which an operator may provide commands, instructions or other input to tractor 24. Operator input 176 may be in the form of a touchscreen, a keyboard, a touchpad, a stylus, a lever arm, a pushbutton or the like. Operator input 176 may be used by an operator to input a command to initiate power hop mitigation or to input other information. For example, notifier 174 may notify the operator of a power hopping phenomena, wherein an operator may input, through operator input 176, a command to initiate the power hop mitigation process. In some implementations, notifier 174 may be omitted, wherein an operator may initiate the power hop mitigation process through input 176 based upon his or her personal observations.

Figure 6:
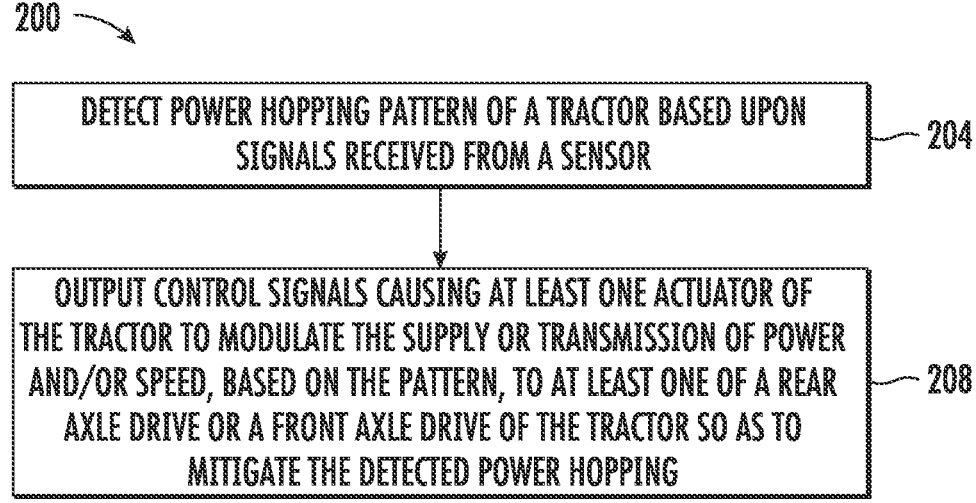
FIG. 6 is a flow diagram of an example power hop mitigation method.

FIG. 6 is a flow diagram of an example method 200 that may be carried out by controller 50 for carrying out a power hop mitigation. Instruction 72 may direct processor 70 to carry out the actions denoted by blocks 204 and 208. As indicated by block 204, a power hopping pattern of a tractor is detected based upon signals received from a sensor, such a sensor 26. The pattern may be in oscillating or sinusoidal pattern, such as the example pattern shown in FIG. 4.

As indicated by block 208, a controller, such as controller 50, may output control signals causing at least one actuator, such as actuator 172-1 or 172-2, to modulate the supply or transmission of power and/or speed, based on the detected pattern, that is to be supplied by at least one of the rear axle drive 60 or the front axle drive 60 so as to mitigate the detected power hopping. As discussed above, in some implementations, the power and/or speed being supplied by front axle drive 60 to front wheels 56 may be reduced in a timed fashion such that the reduction occurs just prior to the expected or anticipated elevation of the front wheels due to power hopping. The reduction in power and/or speed may be oscillating or sinusoidal but offset from a sinusoidal pattern of the power hopping.

Figure 7:
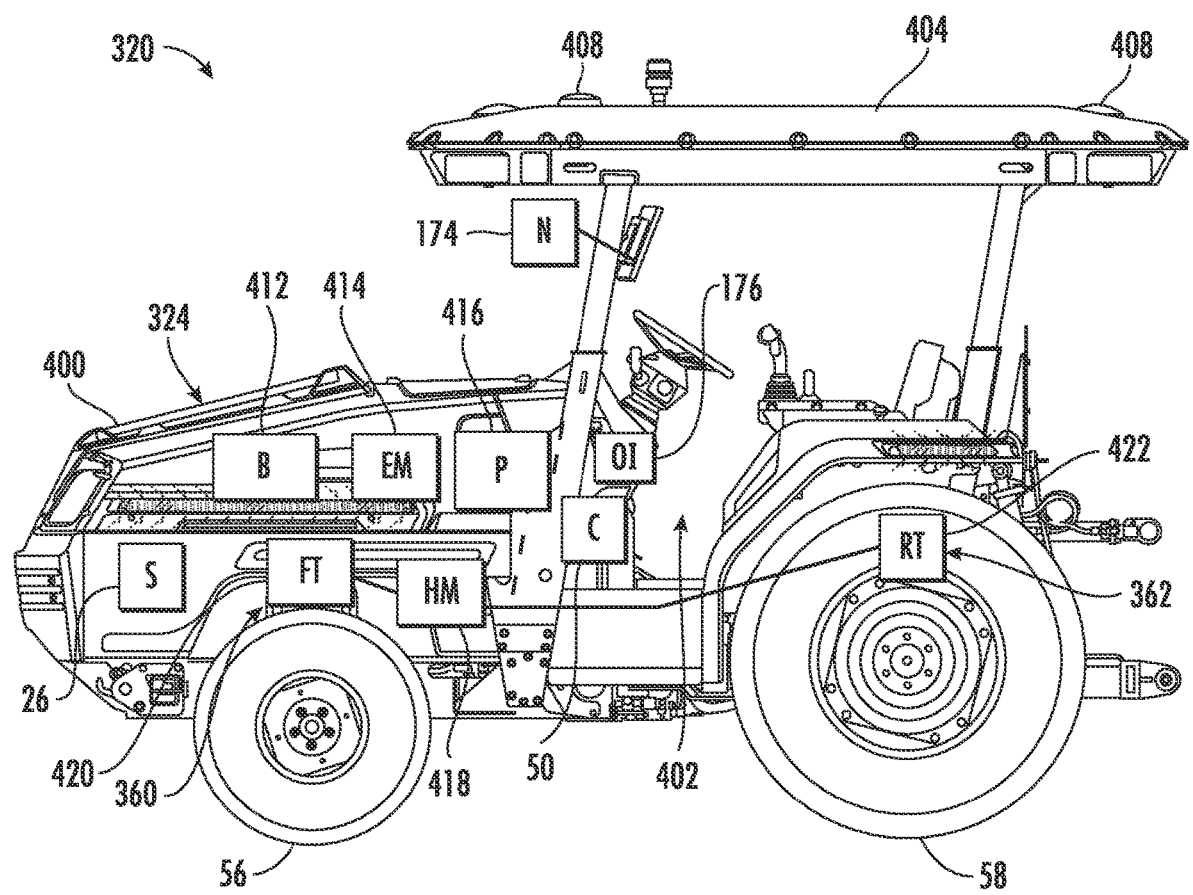
FIG. 7 is a side view of an example power hop mitigation system.

FIG. 7 is a side view of an example power hop mitigation system 320, with certain portions being schematically illustrated. FIG. 7 illustrates an example of how the power hopping system of FIG. 5 may be implemented in a particular tractor. System 320 is similar to system 120 except that system 320 specifically comprises the particular example tractor 324 and the example front axle drive 360 and the example rear axle drive 362. Those remaining components of system 320 which correspond to components of system 120 are numbered similarly.

Tractor 324 comprises a tractor having a main body 400 supporting a cab 402 having a roof 404. Roof 404 supports inertial motion sensors units are sensors 408. Signals from inertial motion sensors 408 are transmitted to controller 50.

Front axle drive 360 and rear axle drive 362 share a common power source in the form of battery 412. Battery 412 may be comprised of multiple rechargeable battery modules. Battery 412 supplies power to and electric motor 414 which drives a hydraulic pump 416. The hydraulic pump 416 drives a hydraulic motor 418. Torque produced by the hydraulic motor 418 is transmitted to front wheels 56 by front transmission 420. Torque produced by hydraulic motor 418 may further be transmitted to rear wheels 58 by rear transmission 422. Transmissions 420 and 422 may include hydraulic valves, clutches or the like for providing adjustable speed and/or power transmission to wheels 56 and 58, respectively. In other implementations, battery 412 may supply power to electric motor 414 which outputs torque that is directly transmitted to wheels 56 and 58 by transmissions 420 and 422, respectively. In some implementations, torque from electric may be used to power a hydraulic pump which drives a hydraulic motor that supplies torque to wheels 56.

Controller 50 operates in a fashion similar to controller 50 of system 20. Controller 50 may initiate a power hop mitigation, such as described above with respect to method 200 automatically in response to determining a power hopping phenomena based upon signals from sensor 26 and/or sensors 408 or in response to a command received from an operator the operator input 176. As noted above, the operator may provide the command in response to a received notification from notifier 174 or based upon his or her personal observations.

Once a power hop mitigation has been triggered or initiated, controller 50 may carry out method 200 described above. Controller 50 may detect the power hopping pattern of tractor 320 based upon the signals received from sensor 26 or sensors 408. The power hopping pattern may be oscillating or sinusoidal as depicted in the example of FIG. 4. Controller 50 may further output control signals adjusting the supply of speed and/or power to at least one of front wheels 56 or rear wheels 58.

In the example illustrated, controller 50 may output control signals adjusting the state of front transmission 420 and/or the state of rear transmission 422 to relatively adjust the speed and/or power of wheels 56 and 58 to reduce power hopping. In some implementations, such reduction may be timed or cycled in a fashion corresponding to the determined power hopping cycle but temporally offset from the power hopping cycle. For example, in one implementation, the speed and such or power being supplied to wheels 56 may be reduced prior to the anticipated or expected time at which front wheels 56 begin to elevate due to such power hopping. In some implementations, separate electric motors may be used to drive front wheels 56 and rear wheels 58. In such implementations, controller 50 may output control signals adjusting the torque output by such electric motors to reduce the speed and/or power of front wheels 56 relative to rear wheels 58 so as to mitigate or reduce power hopping.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A power hop mitigation system comprising:
a tractor comprising:
   front wheels;
   rear wheels;
   a front axle drive to propel the front wheels;
   a rear axle drive to propel the rear wheels;
   a controller that, in response to power hopping by the tractor, is configured to output control signals to modulate power and/or speed supplied by at least one of the front axle drive and the rear axle drive to mitigate power hopping,
      wherein the controller is configured to determine a sinusoidal oscillation pattern for a power hopping circumstance, and wherein the control signals are configured to mitigate power hopping by reducing power and/or speed being supplied by the front axle drive relative to the rear axle drive just prior to a rise of the sinusoidal oscillation pattern.

2. The system of claim 1 further comprising a sensor to output sensor signals, wherein the controller is configured to determine power hopping by the tractor based upon the sensor signals.

3. The system of claim 2, wherein the controller is configured to automatically modulate power and/or speed supplied by at least one of the front axle drive and the rear axle drive to mitigate power hopping in response to determination of power hopping.

4. The system of claim 2, wherein the sensor comprises a sensor selected from a group of sensors consisting of: a speed sensor, a front axle drive torque sensor, an inertial measurement sensor, and an axle load sensor.

5. The system of claim 2 further comprising an actuator to modulate the transmission of power and/or speed to said at least one of the front axle and the rear axle.

6. The system of claim 5, wherein the actuator is selected from a group of actuators consisting of: a clutch, an electric solenoid, and hydraulics.

7. The system of claim 1 further comprising an actuator to modulate the transmission of power and/or speed to said at least one of the front axle and the rear axle.

8. The system of claim 1 further comprising an operator input configured to receive power hop identification input from an operator indicating power hopping of the tractor as determined by the operator, wherein the controller, in response to receiving the power hop identification input from the operator, is configured to output control signals to modulate power and/or speed to at least one of the front axle drive and the rear axle drive to mitigate power hopping.

9. The system of claim 1 further comprising a sensor to output sensor signals, wherein the controller is configured to determine power hopping based upon the sensor signals and to output control signals notifying an operator of the tractor of the power hopping.

10. The system of claim 9 further comprising an operator input configured to receive power hop mitigation input from an operator indicating power hop mitigation should be initiated, wherein the controller, in response to receiving the power hop mitigation input from the operator, is configured to output control signals to modulate power and/or speed supplied by at least one of the front axle drive and the rear axle drive to mitigate power hopping.

11. The system of claim 1, wherein the control signals output by the controller are configured to relatively adjust the power and/or speed supplied by the front axle drive and the rear axle drive.

12. The system of claim 1, wherein the controller is configured to determine a first sinusoidal oscillation pattern for a power hopping circumstance, and wherein the control signals output by the controller are configured to modulate the power and/or speed being supplied by the front axle drive in a second sinusoidal oscillation pattern temporally offset from the first sinusoidal oscillation pattern.

13. The system of claim 12, wherein the controller is configured to determine an updated third sinusoidal oscillation pattern for the power hopping circumstance following the modulation of the power and/or the speed being supplied by the front axle drive in the second sinusoidal oscillation pattern, and wherein the controller is configured to output second control signals configured to modulate the power and/or speed being supplied by the front axle drive in a fourth sinusoidal oscillation different from the second oscillation pattern and temporally offset from the updated third sinusoidal oscillation pattern.

14. A non-transitory computer-readable medium containing instructions for directing a processor to perform power hop mitigation, the instructions being configured to direct the processor to:
  detect power hopping by a tractor based upon signals received from a sensor;
  notify an operator of the tractor of the power hopping; and
  output control signals causing at least one actuator of the tractor to modulate the supply or transmission of power and/or speed supplied by at least one of a rear axle drive or a front axle drive of the tractor so as to mitigate the detected power hopping in response to operator input from an operator interface following notification to the operator of power hopping by the tractor.

15. The medium of claim 14, wherein the instructions are configured to direct the processor to determine a sinusoidal oscillation pattern for a power hopping circumstance, wherein the control signals are configured to mitigate power hopping by reducing power and/or speed being supplied by the front axle drive relative to the rear axle drive just prior to a rise of the sinusoidal oscillation pattern.

16. The medium of claim 14, wherein the instructions are configured to direct the processor to determine a first sinusoidal oscillation pattern for a power hopping circumstance, and wherein the control signals are configured to modulate the power and/or speed being supplied by the front axle drive in a second sinusoidal oscillation pattern temporally offset from the first sinusoidal oscillation pattern.

17. A method for mitigating power hopping, the method comprising:
  detecting power hopping based upon signals from a sensor carried by a tractor;
  notifying an operator of the tractor of the power hopping; and
  in response to power hopping and in response to operator input from an operator interface following the notifying of the operator of power hopping by the tractor, outputting control signals to modulate the power and/or speed supplied by at least one of a rear drive axle and a front drive axle of the tractor so as to mitigate the detected power hopping.

18. The method of claim 17 further comprising determining a sinusoidal oscillation pattern for a power hopping circumstance, wherein the control signals are configured to mitigate power hopping by reducing power and/or speed being supplied by the front axle drive relative to the rear axle drive just prior to a rise of the sinusoidal oscillation pattern.

19. The method of claim 17 further comprising determining a first sinusoidal oscillation pattern for a power hopping circumstance, and wherein the control signals are configured to modulate the power and/or speed being supplied by the front axle drive in a second sinusoidal oscillation pattern temporally offset from the first sinusoidal oscillation pattern.

20. A power hop mitigation system comprising:
  a tractor comprising:
    front wheels;
    rear wheels;
    a front axle drive to propel the front wheels;
    a rear axle drive to propel the rear wheels;
    a controller that, in response to power hopping by the tractor, is configured to output control signals to modulate power and/or speed supplied by at least one of the front axle drive and the rear axle drive to mitigate power hopping,
    wherein the controller is configured to determine a first sinusoidal oscillation pattern for a power hopping circumstance, and wherein the control signals output by the controller are configured to modulate the power and/or speed being supplied by the front axle drive in a second sinusoidal oscillation pattern temporally offset from the first sinusoidal oscillation pattern.

21. The system of claim 20, wherein the controller is configured to determine an updated third sinusoidal oscillation pattern for the power hopping circumstance following the modulation of the power and/or the speed being supplied by the front axle drive in the second sinusoidal oscillation pattern, and wherein the controller is configured to output second control signals configured to modulate the power and/or speed being supplied by the front axle drive in a fourth sinusoidal oscillation different from the second oscillation pattern and temporally offset from the updated third sinusoidal oscillation pattern.

* * * * *